US008750072B2

(12) United States Patent
Luo et al.

(10) Patent No.: US 8,750,072 B2
(45) Date of Patent: Jun. 10, 2014

(54) SEISMIC IMAGING SYSTEMS AND METHODS EMPLOYING A FAST TARGET-ORIENTED ILLUMINATION CALCULATION

(75) Inventors: Mingqiu Luo, Sugar Land, TX (US); Shengwen Jin, Sugar Land, TX (US)

(73) Assignee: Landmark Graphics Corporation, Houston, TX (US)

(*) Notice: Subject to any disclaimer, the term of this patent is extended or adjusted under 35 U.S.C. 154(b) by 436 days.

(21) Appl. No.: 13/258,170

(22) PCT Filed: Apr. 16, 2009

(86) PCT No.: PCT/US2009/040793
§ 371 (c)(1),
(2), (4) Date: Sep. 21, 2011

(87) PCT Pub. No.: WO2010/120301
PCT Pub. Date: Oct. 21, 2010

(65) Prior Publication Data
US 2012/0020186 A1  Jan. 26, 2012

(51) Int. Cl.
*G01V 1/30* (2006.01)
*G01V 1/28* (2006.01)

(52) U.S. Cl.
CPC . *G01V 1/301* (2013.01); *G01V 1/28* (2013.01)
USPC .................. 367/21; 367/38; 702/16

(58) Field of Classification Search
USPC .......................... 367/21, 38; 702/16
See application file for complete search history.

(56) References Cited

U.S. PATENT DOCUMENTS

| 7,196,969 | B1 | 3/2007 | Karazincir et al. |
| 7,400,553 | B1 | 7/2008 | Jin et al. |
| 2008/0130411 | A1 | 6/2008 | Brandsberg-Dhal et al. |
| 2008/0162051 | A1* | 7/2008 | Ikelle .............................. 702/14 |
| 2011/0075516 | A1 | 3/2011 | Xia et al. |

FOREIGN PATENT DOCUMENTS

| WO | WO-2010/082938 | 7/2010 |
| WO | WO-2010/120301 | 10/2010 |

OTHER PUBLICATIONS

Bear, Glenn et al., "The Construction of Subsurface Illumination and Amplitude Maps via Ray Tracing", The Leading Edge, 19(7), (2000), pp. 726-728.

Hoffmann, Jorgen "Illumination, Resolution and Image Quality of PP- and PS-Waves for Survey Planning", The Leading Edge, 20(9), (2001), pp. 1008-1014.

(Continued)

*Primary Examiner* — Ian J Lobo
(74) *Attorney, Agent, or Firm* — Krueger Iselin LLP; Bradley A. Misley

(57) ABSTRACT

In various disclosed seismic imaging systems and methods, a fast target-oriented illumination calculation technique is employed to obtain a data volume or "matrix" of approximate illumination values. These illumination values enable an image matrix of "true reflectivity" values to be found. The illumination values are derived from Green's functions which, rather than being calculated and re-calculated on a shot-by-shot basis, are calculated in multi-shot groups and combined with a rolling-sum to greatly reduce the computational overhead. As a consequence, the disclosed systems and methods can provide target region illuminations more quickly and/or with higher quality than those systems relying on conventional 3D wave-equation illumination.

20 Claims, 5 Drawing Sheets

(56) References Cited

OTHER PUBLICATIONS

Luo, M. et al., "Recover Scattering Wave Amplitudes from Back Propagated Waves", Technical Report No. 12, Modeling and Imaging Project, University of California, Santa Cruz, (2005), pp. 25-33.

Muerdter, David et al., "Understanding Subsalt Illumination through Ray-Traces Modeling, Part 1: Simple 2 D Salt Models", The Leading Edge, 20(6), (2001), pp. 578-594.

Muerdter, David et al., "Understanding Subsalt Illumination through Ray-Trace Modeling, Part 2: Dippling Salt Bodies, Salt Peaks, and Non-reciprocity of Subsalt Amplitude Response", The Leading Edge, 20(7), (2001), pp. 688-697.

Muerdter, David et al., "Understanding Subsalt Illumination Through Ray-Trace Modeling, Part 3: Salt Ridges and Furrows, and Impact of Acquisition Orientation", The Leading Edge, 20(8), (2001), pp. 803-816.

PCT International Search Report and Written Opinion, dated Jun. 8, 2009, Appl No. PCT/US2009/040793, "Seismic Imaging Systems and Methods Employing a Fast Target-Oriented Illumination Calculation", filed Apr. 16, 2009, 9 pgs.

Schneider, William A., et al., "Efficient and Accurate Modeling of 3-D Seismic Illumination", SEG Expanded Abstracts 18, (Fall 1999), pp. 633-636.

Wu, R. S., et al., "Mapping Directional Illumination and Acquisition-Aperture Efficacy by Beamlet Propagator", SEG Expanded Abstracts 21, (2002), p. 1352.

Xie, Xiao B., et al., "Extracting an Angle Domain Information from Migrated Wavefield", SEG 72nd Annual Meeting, Expanded Abstracts 21, (Oct. 6, 2002), p. 1352.

Xie, Xiao B., et al., "Three-Dimensional Illumination Analysis Using Wave Equation Based Propagator", SEG Expanded Abstracts 22, (2003), pp. 1360-1363.

Xie, Xiao-Bi et al., "Wave-Equation-Based Seismic Illumination Analysis", Geophysics, vol. 71, No. 5, (Sep. 20, 2006), pp. S169-S177, and 10 Figs.

* cited by examiner

SEISMIC IMAGING SYSTEMS AND METHODS EMPLOYING A FAST TARGET-ORIENTED ILLUMINATION CALCULATION

BACKGROUND

Seismology is used for exploration, archaeological studies, and engineering projects that require geological information. Exploration seismology provides data that, when used in conjunction with other available geophysical, borehole, and geological data, can provide information about the structure and distribution of rock types and their contents. Such information greatly aids searches for water, geothermal reservoirs, and mineral deposits such as hydrocarbons and ores. Most oil companies rely on exploration seismology to select sites in which to drill exploratory oil wells.

Traditional seismology employs artificially generated seismic waves to map subsurface structures. The seismic waves propagate from a source down into the earth and reflect from boundaries between subsurface structures. Surface receivers detect and record reflected seismic waves for later analysis. Though some large-scale structures can often be perceived from a direct examination of the recorded signals, the recorded signals must be processed to remove distortion and reveal finer detail in the subsurface image. Various existing processing methods do not sufficiently remove distortion, and they require excessively long computation times. Improved systems and methods are disclosed herein.

BRIEF DESCRIPTION OF THE DRAWINGS

A better understanding of the various disclosed embodiments can be obtained when the following detailed description is considered in conjunction with the following drawings, in which.

Figure 1:
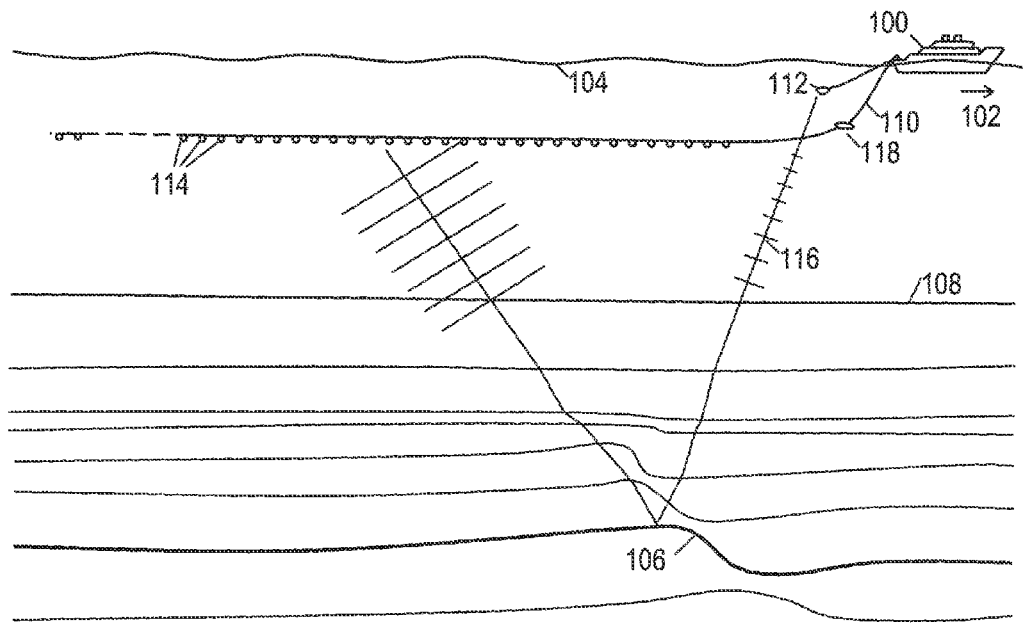
FIG. 1 shows a side view of an illustrative marine seismic survey environment.

While the invention is susceptible to various modifications and alternative forms, specific embodiments thereof are shown by way of example in the drawings and will herein be described in detail. It should be understood, however, that the drawings and detailed description are not intended to limit the disclosed embodiments to the particular form shown, but on the contrary, the intention is to cover all modifications, equivalents and alternatives falling within the spirit and scope of the appended claims.

DETAILED DESCRIPTION

Disclosed herein are various seismic imaging systems and methods that employ a fast target-oriented illumination calculation technique. A data volume or "matrix" of approximate illumination values are calculated and employed to estimate an image matrix of true reflectivity values. The illumination values are derived from Green's functions which, rather than being calculated and re-calculated on a shot-by-shot basis, are calculated in multi-shot groups and combined with a rolling-sum to greatly reduce the computational overhead. As a consequence, the disclosed systems and methods can provide target region illumination values more quickly and/or with higher quality than those systems relying on conventional 3D wave-equation illumination.

In at least some embodiments, a disclosed seismic imaging system includes at least one storage device, a memory, and at least one processor. The storage device(s) store shot gathers from a seismic survey of a given survey region. The memory stores seismic imaging software that, when executed by the processor(s), configures the system to retrieve multiple shot gathers from the storage device and group those shot gathers having overlapping receiver positions to form multi-shot gathers. For each of the shot and receiver positions in a multi-shot gather, the system concurrently determines a Green's function wave field at potential scattering points in the survey region. (As explained in further detail herein, having these Green's functions concurrently available eliminates a significant amount of re-calculation.) The system combines the Green's functions to find an illumination value at each of the potential scattering points and to calculate a corresponding seismic reflectivity value based at least in part on the illumination values. From these reflectivity values, the system generates an illumination of the survey region which can be subjected to further processing or displayed for use by an analyst.

In some implementations, the multi-shot gathers each correspond to one sail line in a marine seismic survey. Other efficiencies can be achieved by determining the Green's functions using one-way wave equation propagation with beamlet decomposition and direct local plane wave decomposition in the frequency domain. The concurrent determination of each of the Green's functions can be performed for one depth slice of the survey region at a time, and the illumination value determination carried out before propagating the Green's functions to the next depth slice. As previously mentioned, significant computational savings can be achieved in the illumination value determination if one of the required summation terms is calculated on a rolling sum basis. Additional savings are achievable by limiting the calculation of the illumination values to target regions of interest, rather than carrying out the computation for the entire survey volume. These and other variations of the disclosed imaging systems and methods are described below.

Exploration seismology is routinely performed both on land and at sea. At sea, seismic survey ships deploy streamers behind the ship as shown in FIG. 1. Each streamer 110 trails behind the ship 100 as the ship moves forward (in the direction of arrow 102), and each streamer includes multiple evenly-spaced receivers 114. Each streamer 110 may further include a programmable diverter 118 and programmable depth controllers that pull the streamer out to an operating offset distance from the ship's path (see FIG. 2) and down to a desired operating depth (FIG. 1).

Streamers 110 may be up to several kilometers long, and are usually constructed in sections 25 to 100 meters in length that include groups of up to 35 or more uniformly spaced receivers. Each streamer 110 includes electrical or fiber-optic cabling for interconnecting receivers 114 and the seismic equipment on ship 100. Data is digitized near the receivers 114 and transmitted to the ship 100 through the cabling at rates of 7 (or more) million bits of data per second.

As shown in FIG. 1, seismic survey ship 100 can also tow one or more sources 112. Source 112 may be an impulse source or a vibratory source. The receivers 114 used in marine seismology are commonly referred to as hydrophones, and are usually constructed using a piezoelectric transducer. Various suitable types of hydrophones are available such as disk hydrophones and cylindrical hydrophones. Sources 112 and receivers 114 typically deploy below the ocean's surface 104. Processing equipment aboard the ship controls the operation of the sources and receivers and records the acquired data.

Seismic surveys provide data for imaging below the ocean surface 104 to reveal subsurface structures such as structure 106, which lies below the ocean floor 108. Analysts can map the topography of the subsurface layers and study the characteristics of recorded seismic data studied to determine the locations of oil and/or gas reservoirs.

To image the subsurface structure 106, source 112 emits seismic waves 116 that are reflected where there are changes in acoustic impedance due to subsurface structure 106 (and other subsurface structures). The reflected waves are detected by a pattern of receivers 114. By recording (as a function of time) the arriving seismic waves 116 that have traveled from source 112 to subsurface structure 106 to receivers 114, an image of subsurface structure 106 can be obtained after appropriate data processing.

Figure 2:
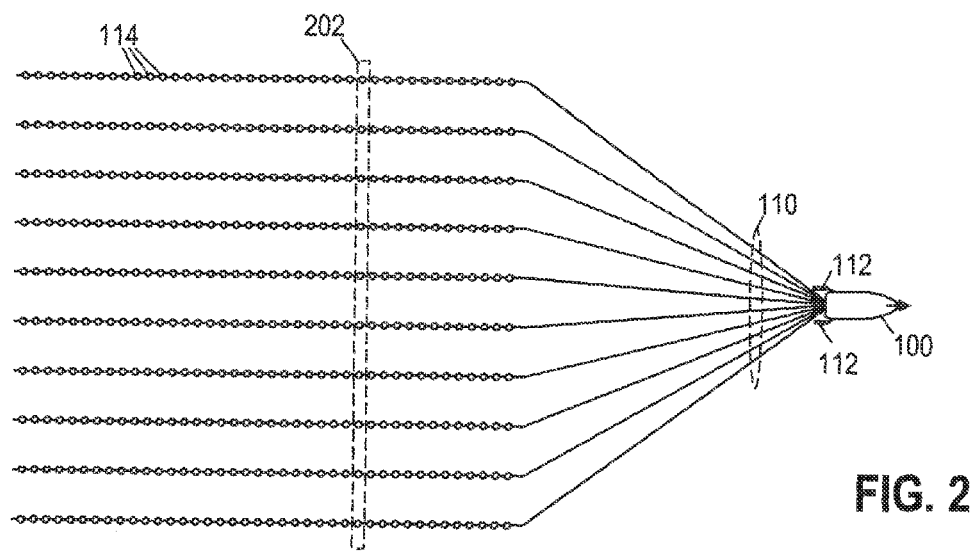
FIG. 2 shows a top view of an illustrative marine seismic survey environment.

FIG. 2 shows an overhead view (not to scale) of the seismic survey ship 100 towing a set of streamers 110 and two sources 112. As the ship 100 moves forward, the sources are triggered alternately in a so-called flip-flop pattern. Programmable diverters are used to provide roughly even spacing between the streamers. The receivers at a given position on the streamers are associated with a common field file trace number or common channel 202.

Figure 3:
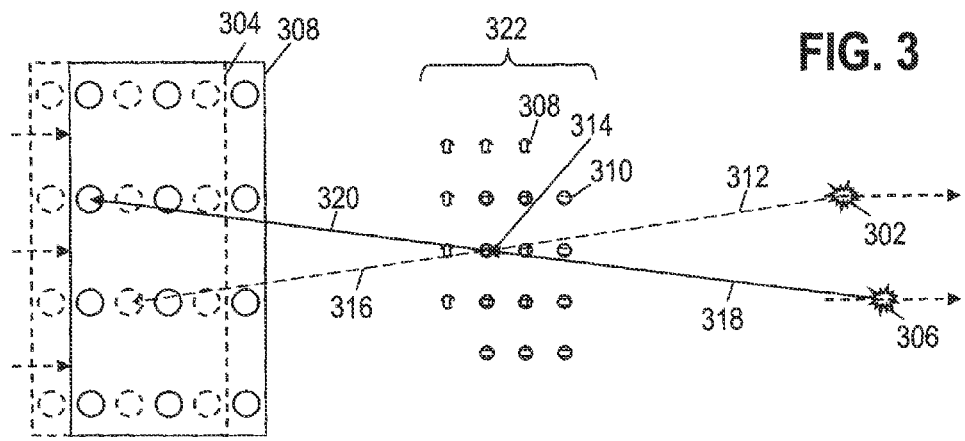
FIG. 3 shows an illustrative midpoint pattern that result from flip-flop shots received by a given channel.

FIG. 3 shows an overhead view of illustrative source and receiver positions for two shots. For a first shot, one source is triggered at position 302, and the illustrated portion of the receiver array is at position 304 (shown in broken outline). For a second shot, a source is triggered at position 306 and the illustrated portion of the receiver array is at position 308 (shown in solid outline). Assuming for the moment that the reflecting subsurface structures are horizontal, the seismic waves that reach each of the twelve receivers are reflected from a position underneath the midpoint between the source and receiver positions. Thus, the first shot produces reflections from beneath the twelve midpoints 308 (shown in broken outline with vertical crosshatching), while the second shot produces reflections from beneath the twelve midpoints 310 (shown in solid outline with horizontal crosshatching). As one example, vector 312 illustrates propagation of seismic energy from the shot 302 to a midpoint 314, and an equal length vector 316 shows the reflected seismic energy propagating to a receiver position. For the second shot 306, the vectors 318 and 320 show a similar propagation path. Note that midpoint 314 is one of the midpoints that is "hit" by multiple shots, thereby making more signal energy available from these areas when the information from the shots is processed and combined. Seismic surveys (for both land and sea) are generally designed to provide an evenly-distributed grid of midpoints with a fairly high average hit count for each midpoint.

Figure 4:
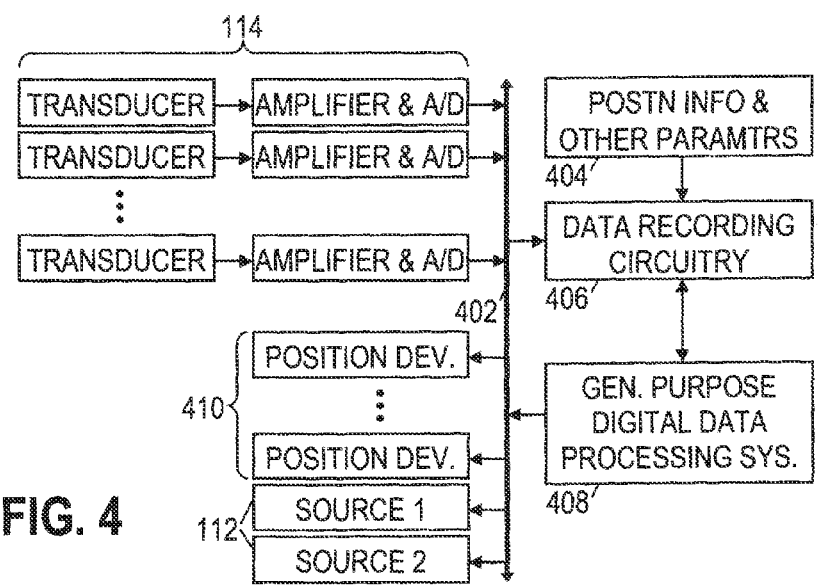
FIG. 4 shows an illustrative seismic survey recording system.

FIG. 4 shows an illustrative seismic survey recording system having the receivers 114 coupled to a bus 402 to communicate digital signals to data recording circuitry 406 on survey ship 100. Position information and other parameter sensors 404 are also coupled to the data recording circuitry 406 to enable the data recording circuitry to store additional information useful for interpreting the recorded data. Illustratively, such additional information may include array orientation information and velocity information.

A general purpose digital data processing system 408 is shown coupled to the data recording circuitry 406, and is further shown coupled via bus 402 to positioning devices 410 and seismic sources 112. Processing system 408 configures the operation of recording circuitry 406, positioning devices 410, and seismic sources 112. Recording circuitry 406 acquires the high speed data stream(s) from receivers 114 onto a nonvolatile storage medium such as a storage array of optical or magnetic disks. Positioning devices 410 (including programmable diverters and depth controllers) control the position of receivers 114 and sources 112.

The seismic recording system of FIG. 4 may include additional components not specifically shown here. For example, each streamer 110 could have an independent bus 402 for coupling to the data recording circuitry. Processing system 408 includes a user interface having a graphical display and a keyboard or other method of accepting user input, and it can further include a network interface for communicating stored seismic survey data to a central computing facility having powerful computing resources for processing the seismic survey data.

Figure 5:
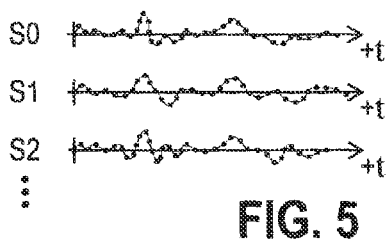
FIG. 5 shows an illustrative set of traces.

FIG. 5 shows illustrative seismic signals (also called "traces") detected and sampled by receivers 114. The signals indicate some measure of seismic wave energy as a function of time (e.g., displacement, velocity, acceleration, pressure), and they are digitized at high resolution (e.g., 24 bits) at a programmable sampling rate. Such signals can be grouped in different ways, and when so grouped, they are called a "gather". For example, a "common midpoint gather" is the group of traces that have a midpoint within a defined region. A "shot gather" is the group of traces recorded for a single firing of the seismic source. A "multi-shot gather" is a group of shot gathers, often including all the traces recorded along a sail line in a marine seismic survey.

Figure 6:
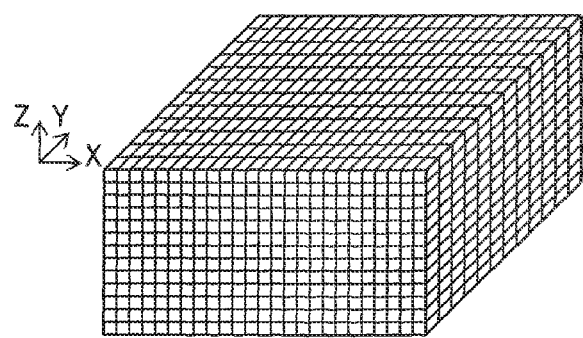
FIG. 6 shows an illustrative data volume in three dimensions.

The recorded seismic survey data is of little use when maintained in the format of FIG. 5. Although it is possible to plot the various recorded waveforms side by side in a plot that reveals large scale subsurface structures, such structures are distorted and finer structures cannot even be seen. Hence the data is processed to create a data volume, i.e., a three dimensional array of data values such as that shown in FIG. 6. The data volume represents some seismic attribute throughout the survey region. The three-dimensional array comprises uniformly-sized cells, each cell having a data value representing the seismic attribute for that cell. Various seismic attributes may be represented, and in some embodiments, each cell has multiple data values to represent multiple seismic attributes. Examples of suitable seismic attributes include reflectivity, acoustic impedance, acoustic velocity, and density. The volumetric data format more readily lends itself to computational analysis and visual rendering, and for this reason, the data volume may be termed a "three-dimensional image" of the survey region.

Figure 7:
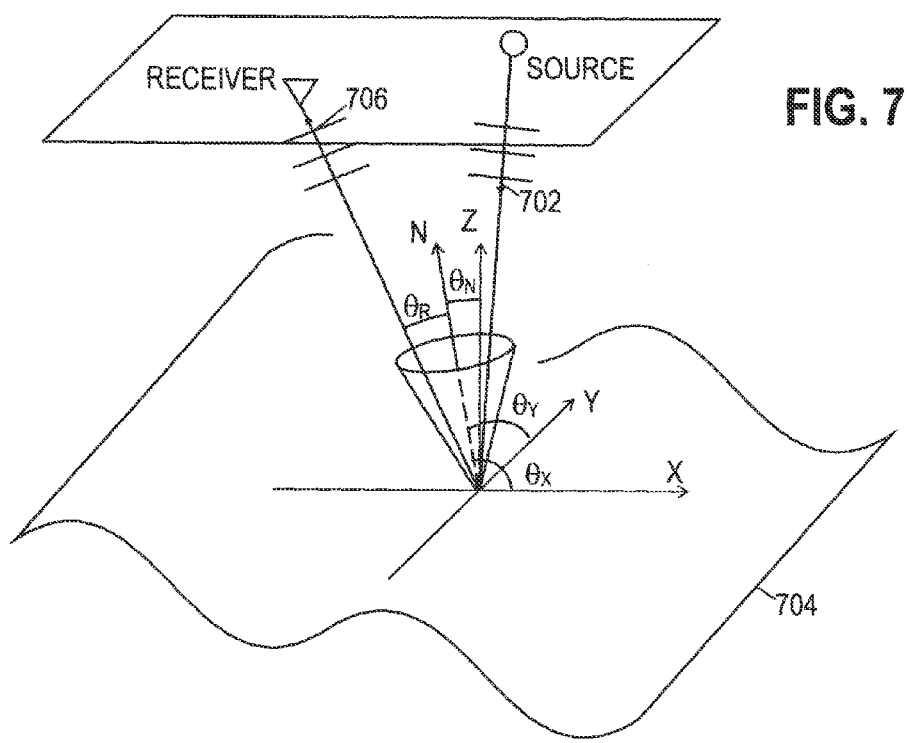
FIG. 7 shows an illustrative shot geometry.

FIG. 7 shows how various parameters relate to the geometry of an illustrative shot. Seismic energy propagates along ray 702 from a seismic source to a target interface 704 and reflects towards a receiver along ray 706. At the reflection point (represented elsewhere by an (x,y,z) coordinate and abbreviated as a vector $\bar{x}$), the surface has a normal vector $\bar{n}$. In a predefined coordinate system having the x- and y-axes in a horizontal plane and an upward-pointing z-axis, the normal vector $\bar{n}$ forms an angle with each axis. The angle between the normal vector $\bar{n}$ and the x-axis is $\theta_x$, the angle between the normal vector $\bar{n}$ and the y-axis is $\theta_y$, and the angle between the z-axis and the normal vector $\bar{n}$ is $\theta_n$. The incoming ray 702 and reflected ray 706 are at equal (but opposite) "opening" angles $\theta_r$ relative to the normal vector. Relative to the z-axis, the incoming ray 702 forms incident angle $\theta_s$ and the reflected ray forms receiving (aka scattering) angle $\theta_g$. The incident and scattering angle pair ($\theta_s$, $\theta_g$) can be converted to a normal and opening angle pair ($\theta_n$, $\theta_r$) according to the relationships:

$$\bar{\theta}_n = (\bar{\theta}_s + \bar{\theta}_g)/2, \theta_r = (\bar{\theta}_s - \bar{\theta}_g)/2. \quad (1)$$

With this understanding of the shot geometry, we now turn to a discussion of illumination analysis and its role in imaging a subsurface region. Loosely speaking, illumination analysis involves a determination of how much seismic energy is available to be reflected by a given volume in the direction of the receivers. As such, the illumination is a function of the shot geometries of each hit on the reflection point.

Illumination analysis is a powerful tool for studying the effects of acquisition aperture and overlaying structure on image quality. Most existing techniques for predicting illumination intensity distributions are based on ray tracing modeling. See, e.g., Bear, G, LU, C., Lu, R. and Willen, D., 2000, "The construction of subsurface illumination and amplitude maps via ray tracing", The Leading Edge, 19(7), 726-728; Muerdter, D., and Ratcliff, D., 2001, "Understanding subsalt illumination through ray-trace modeling, Part 1: Simple 2D salt models", The Leading Edge, 20(6), 578-594; Muerdter, D., Kelly, M. and Ratcliff, D., 2001, "Understanding subsalt illumination through ray-trace modeling, Part 2: Dipping salt bodies, salt peaks, and nonreciprocity of subsalt amplitude response", The Leading Edge, 20(7), 688-687; Muerdter, D., and Ratcliff, D., 2001, "Understanding subsalt illumination through ray-trace modeling, Part 3: Salt ridges and furrows, and impact of acquisition orientation", The Leading Edge, 20(8), 803-816; Schneider, W. A. and Winbow, G. A., 1999, "Efficient and accurate modeling of 3-D seismic illumination", SEG Expanded abstracts 18, 633-636.

Although ray tracing is inexpensive, the resulting illumination map may bear large errors in complex areas due to the high frequency approximation involved and the singularity problem created by ray tracing. See e.g., Hoffmann, 2001, "Illumination, resolution and image quality of PP- and PS-waves for survey planning", The Leading Edge, 20(9), 1008-1014. To combat these issues, beamlet decomposition and direct local plane wave decomposition are used to obtain localized angle domain information for frequency domain wavefields. More specifically, the techniques disclosed by Wu, R. S. and Chen, L. 2002, "Mapping directional illumination and acquisition-aperture efficacy by beamlet propagator", SEG Expanded Abstracts 21, 1352; and Xie, X. B. and Wu, R. S., 2002, "Extracting angle related image from migrated wavefield", Expanded abstracts, SEG 72nd Annual Meeting, 1360-1363; are used to determine source and receiver wavefields that are functions of position, frequency, and incidence or scattering angle. These decompositions enable illumination analyses to be performed with the wave equation based methods, especially including one-way wave equation propagators. More detail on such methods is available in Xie, X. B, Jin, S, and Wu, R. S., 2003, "Three-dimensional illumination analysis using wave equation based propagator", SEG Expanded Abstracts 22, 989. Existing implementations of such methods have proven to be computationally intensive and slow due to their shot-by-shot approach to calculating illumination.

The presently disclosed approach for calculating illumination can employ one or more of the following three features to speed the computation of illumination: calculate the illumination of target areas rather than for the whole data volume, perform the calculation on a multi-shot by multi-shot basis rather than a shot-by-shot basis, and use a rolling sum in the illumination calculation rather than re-summing from scratch each time.

The ultimate goal is to generate a data volume of seismic reflectivity, which can then be studied by analysts as part of their efforts to locate reservoirs and mineral deposits. As explained in Luo, M. and Xie, X. B., 2005, "Amplitude recovery from back propagated waves to true scattered waves", Technical Report No. 12, Modeling and Imaging Project, University of California, Santa Cruz, 25-34, the "true reflectivity" image can be written as:

$$R(\bar{x}) = \sum_{\bar{\theta}_s} \sum_{\bar{\theta}_g} \sum_{\omega} \sum_{s=1}^{n_{stk}} \frac{u_g(\bar{x}, \omega, s, \bar{\theta}_g) \cdot u_s(\bar{x}, \omega, s, \bar{\theta}_s)^*}{n_{stk} |u_s(\bar{x}, \omega, s, \bar{\theta}_s)|^2 \sum_r |G(\bar{x}, r, \omega, s, \bar{\theta}_g) \partial_n G(r, \bar{x}, \omega, s, \bar{\theta}_g)|}, \quad (2)$$

where $R(\bar{x})$ denotes reflectivity (the scattering coefficient), $u_s(\bar{x},\omega,s,\bar{\theta}_s)$ denotes the (frequency domain) pressure wavefield at scattering point $\bar{x}$ and frequency $\omega$ with incidence angle $\bar{\theta}_s$ propagated from shot index number s, and $u_g(\bar{x},\omega s, \bar{\theta}_g)$ denotes the (frequency domain) pressure wavefield at scattering point $\bar{x}$ and frequency $\omega$ with scattering angle $\bar{\theta}_g$ back-propagated from receiver index number r. $G(\bar{x},r,\omega,s,\bar{\theta}_g)$ is the Green's function from scattering point $\bar{x}$ to receiver r (at frequency $\omega$ with scattering angle $\bar{\theta}_g$) for shot s, and $\partial_n G(r,\bar{x},\omega,s,\bar{\theta}_g)$ stands for the angle component of the back-propagated Green's function from receiver r to scattering point $\bar{x}$. The fold number $n_{stk}=n_{stk}(\bar{x},\omega,\bar{\theta}_s,\bar{\theta}_g)$ denotes the multiple (aka "multifold", "stack count" or "hit count") at each point $\bar{x}$ and frequency $\omega$ with incidence angle $\bar{\theta}_s$ and receiving angle $\bar{\theta}_g$.

In making certain simplifying assumptions to reduce the computational complexity of equation (2), we begin by noting that the Green's function can be viewed as the wavefield that is produced in response to an impulse in time and space. Consequently, the source wavefield can expressed in terms of the Green's function and a constant frequency coefficient, that is:

$$u_s(\bar{x}, \omega, s, \bar{\theta}_s) = f(\omega) \cdot G(\bar{x}, \omega, s, \bar{\theta}_s). \quad (3)$$

This observation enables equation (2) to be rewritten in terms of Green's functions.

By way of simplification, if we ignore 1) the frequency coefficients $f(\omega)$, 2) the difference between $G(r,\bar{x},\omega,\theta_g)$ and $\partial_n G(r,\bar{x},\omega,\theta_g)$, and 3) the difference between $G(r,\bar{x},\omega,\theta_g)$ and $G(\bar{x},r,\omega,\theta_g)$, we can substitute the following illumination matrix for the denominator in equation (2):

$$D(\vec{x}, \omega, \theta_s, \theta_g) = \sum_{s=1}^{n_{stk}} |G(\vec{x}, \omega, s, \theta_s)|^2 \sum_r |G(\vec{x}, r, \omega, s, \theta_g)|^2. \quad (4)$$

For convenience, we define the numerator of equation (2) as the convolution image matrix in local angle domain:

$$I(\vec{x}, \omega, s, \theta_s, \theta_g) = u_g(\vec{x}, \omega, s, \theta_g) \cdot u_s(\vec{x}, \omega, s, \theta_s)^*. \quad (5)$$

The "true reflectivity" image condition becomes:

$$R(\vec{x}, \omega, s, \theta_s, \theta_g) = \frac{I(\vec{x}, \omega, s, \theta_s, \theta_g)}{D(\vec{x}, \omega, s, \theta_s, \theta_g)}. \quad (6)$$

Thus the illumination matrix D( . . . ) serves as an approximate correction factor to convert a traditional image matrix I( . . . ) to a true reflectivity image matrix R( . . . ).

As an aside we note that it is possible, using relationships of equation (1), to sum over normal (dip) angles $\theta_n$ or over opening angles $\theta_r$ to obtain the dip angle indexed illumination vector or opening angle indexed illumination vector. That is, $$D(\vec{x}, \omega, \bar{\theta}_n) = \sum_{\theta_r} D(\vec{x}, \omega, \bar{\theta}_n, \theta_r), \quad (7)$$

$$D(\vec{x}, \omega, \theta_r) = \sum_{\bar{\theta}_n} D(\vec{x}, \omega, \bar{\theta}_n, \theta_r). \quad (8)$$

Figure 8:
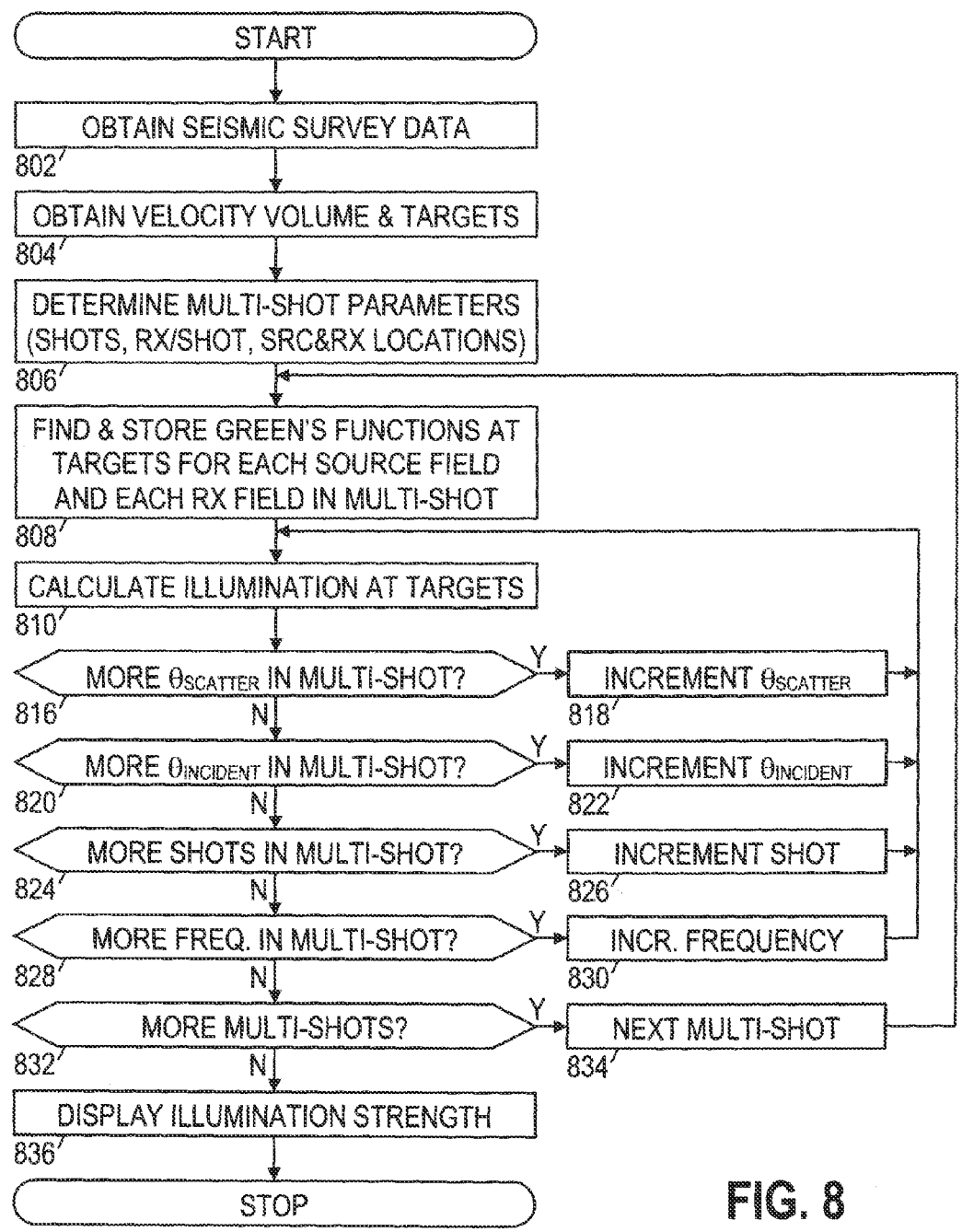
FIG. 8 shows a flowchart of an illustrative seismic imaging method.

We turn now to FIG. 8, which is a flowchart of an illustrative seismic imaging method employing a fast, target-oriented illumination calculation. In block 802, a computer obtains the seismic survey data. The seismic survey data, which may have been gathered as outlined previously, is generally stored in a structured form in a disk array to enable high bandwidth accessibility by a parallel processing computer system. In block 804, the computer obtains a velocity volume, i.e., an indication of seismic velocities at each point in the region of interest. The velocity volume can be derived from the seismic survey data using known techniques. See, e.g., Jon F. Claerbout, *Fundamentals of Geophysical Data Processing*, p. 246-56, which is hereby incorporated herein by reference. Alternatively, the velocity volume can be at least partly derived from other sources, e.g., well logs. Initial stacking and analysis of the seismic traces generally reveals the rough outline of subsurface structures in the region of interest, which can be used to identify particular target regions where an accurate image is desired.

In block 806, the survey data is divided into multi-shot groups depending on the available computing resources. As will be described further below, the use of smaller groups requires less information storage but increases the computational burden. If sufficient storage is available, the group-size is chosen to take maximum advantage of overlapping shot and/or receiver positions. In a marine survey, the preferred multi-shot group is one or more sail lines. In a land survey, the preferred multi-shot group covers all of the shots for one position of the receiver array, though this can be extended in surveys employing a rolling strategy in which new shots are taken each time a small fraction of the receivers are repositioned. The characteristics of each multi-shot group identified by the computer include the number of shots, the number of receivers (i.e., traces) per shot, and the positions of the source and each receiver.

In block 808, the computer calculates the Green's functions from each of the points in the target regions to each of the shot and receiver positions in the multi-shot, i.e., $$G(\vec{x}, \omega, s, \theta_s) \text{ and } G(\vec{x}, r, \omega, s, \theta_g), \quad (9)$$

for all $\vec{x}$ in the target region and all s and r in the multi-shot. As previously mentioned, the Green's function can be determined by applying a time impulse at the position of the source or receiver and propagating the wave function to each point $\vec{x}$ in the target region. The beamlet and angle decomposition methods previously described can be used to carry out this determination efficiently.

In block 810 the computer uses the stored Green's functions to calculate the illumination matrix of equation (4) for each point $\vec{x}$ in the target region. However, rather than recalculating the illumination matrix from scratch each time, we define a summation term:

$$A(\vec{x}, \omega, s, \theta_g) = \sum_r^{n_{recv}} |G(r, \vec{x}, \omega, s, \theta_g)|^2 \quad (10)$$

After performing this summation for one shot, we can then take advantage of the fact that there are normally lots of overlapped receivers for two adjacent shots by "updating" the sum on a rolling basis. The update removes the contribution from those receiver positions that appear only for the preceding shot and adds the contribution from those receiver positions that weren't in the preceding shot but are in the current shot, that is, $$A(\vec{x}, \omega, s+1, \theta_g) = \quad (11)$$
$$A(\vec{x}, \omega, s, \theta_g) - \sum_r^{n_{sub}} |G(r, \vec{x}, \omega, \theta_g)|^2 + \sum_r^{n_{add}} |G(r, \vec{x}, \omega, \theta_g)|^2$$

Because normally the number of Green's functions removed and added is dramatically less than the total number of receivers, this "rolling sum" approach provides significant computational savings.

The computer can store the calculated illumination matrix values as a function of position, frequency, shot index, incident angle, and scattering angle. With the illumination matrix in hand, the computer is able to later determine the reflectivity condition of equation (6) for each of the points in the target region, thereby obtaining the contribution of one shot to the reflectivity image. These contributions can be accumulated over all of the shots to obtain a cumulative reflectivity image over the target region. Such calculations can be carried out separately.

In block 816, the computer evaluates whether more scattering angles exist and if so, increments the scattering angle $\theta_g$ in block 818 and loops back to block 810. In this manner, blocks 810-818 implement one of the summations in equation (2). In block 820, the computer determines whether more incident angles exist and if so, increments the incident angle $\theta_s$ in block 822 and loops back to block 810. In this manner, blocks 820-822 implement another of the summations in equation (2). Similarly, blocks 824 and 826 provide summation over shot index s, while blocks 828 and 830 provide summation over the frequency ranges ω. Finally, in block 832 the computer determines whether there are more multi-shots and if so, increments to the next multi-shot group in block 834. The computer loops back to block 808 to calculate the Green's functions for the new multi-shot.

Once all of the looping has been completed in block 832, the total illumination strength at each point in the target regions can be calculated and displayed in block 836. The stored illumination matrix values can also be stored for future processing, e.g., to determine the reflectivity image using the approximation of equation (6).

The advantages of the method outlined above can be highlighted in three ways. First, the foregoing method makes the best use of computation time and resources by minimizing the number of Green's functions calculated. The following examples are discussed for comparison purposes, and they each assume a 3D survey having 200 sail lines with 200 shots per sail line. Moreover, 200 receiver traces are acquired for each shot, and the average fold number (hit count) is approximately 100. The subsurface volume is such that one depth-slice for one Green's function fills 2 MB of memory, while the full data volume for a Green's function wave field fills 1 GB on disk. The assumed time unit is the time for calculating one Green's function data volume. The comparison results for each illustrative method discussed below are shown in the following table:

method offers an excellent tradeoff between memory/storage requirements and computational time.

The method of FIG. 8 achieves an added computational time savings by using the running sums approach of equation (11). If the receiver locations have an overlap of p (usually a percentage in excess of 95%), the computational savings will be approximately (2p-1).

The method of FIG. 8 achieves a third computational time savings by calculating and storing illumination and reflectivity values only for target regions of interest. Since the target regions typically present only a small fraction of the total survey volume, the target region approach eliminates many unnecessary calculations. Of course, the savings is highly dependent on the relative size of the target region and the survey volume.

It is contemplated that the operations shown in FIG. 8 may be implemented in the form of software, which can be stored in computer memory, in long-term storage media, and/or in portable information storage media. It should be noted that illustrative method of FIG. 8 is provided as an explanatory aid. In practice, the various operations shown in FIG. 8 may be performed in different orders and are not necessarily sequential. For example, seismic data processing can benefit substantially from parallelism. In some processing method embodiments, data from different survey regions may be processed independently. In other embodiments, the operations may be "pipelined" so that individual reflectivity contributions are determined by operations in the sequence

| Method | Lines | Shots/line | Receivers | Fold | Green's | Memory | Disk | Time |
|---|---|---|---|---|---|---|---|---|
| 1 | 200 | 200 | 200 | 100 | 80,000 | 160 G | 0 | 80,000 |
| 2 | 200 | 200 | 200 | 100 | 80,000 | 0.002 G | 80,000 G | 80,000 |
| 3 | 1 × 200 | 1 × 200 | 200 | 100 | 200 × 40,000 | 0.4 G | 0 | 8,000,000 |
| 4 | 2 × 100 | 200 | 200 | 40 | 2000 × 100 | 4.0 G | 0 | 200,000 |

In the first illustrative method, all the Green's functions for each shot and receiver location in the survey are calculated simultaneously. That is, each depth layer is propagated from a previous layer and the reflectivity calculation is performed concurrently so that it is unnecessary to store full Green's function data volumes. This method offers a great speed advantage, but, as can be observed in the foregoing table, the memory requirements are prohibitive for this method.

In the second illustrative method, all of the Green's functions for each shot and receiver location in the survey are calculated and stored on disk. With this approach, the full wave field data volume is saved for each Green's function. This method is as fast as the first method, but note that now the required disk capacity is prohibitive.

In the third illustrative method, the illumination matrix is calculated shot by shot. That is, the Green's functions are calculated for the current location of the shot and receivers in a given shot, then recalculated for the next shot. The memory and storage requirements are extremely feasible, but the time required for this method is prohibitive.

In the fourth illustrative method, the illumination matrix is calculated as described in FIG. 8, i.e., multi-shot by multi-shot. That is, the Green's function wave field data volumes (or in the present example, the depth slice wave fields) for a number of shots is calculated at the same time to get the illumination for these shots. The number of Green's functions depends on the number of shots and the number of receivers for each shot. The number of shots calculated simultaneously depends on the memory capability of the computer. This shown, even though the operations are all occurring concurrently. Additional operations may be added to the illustrative method and/or several of the operations shown may be omitted.

Figure 9:
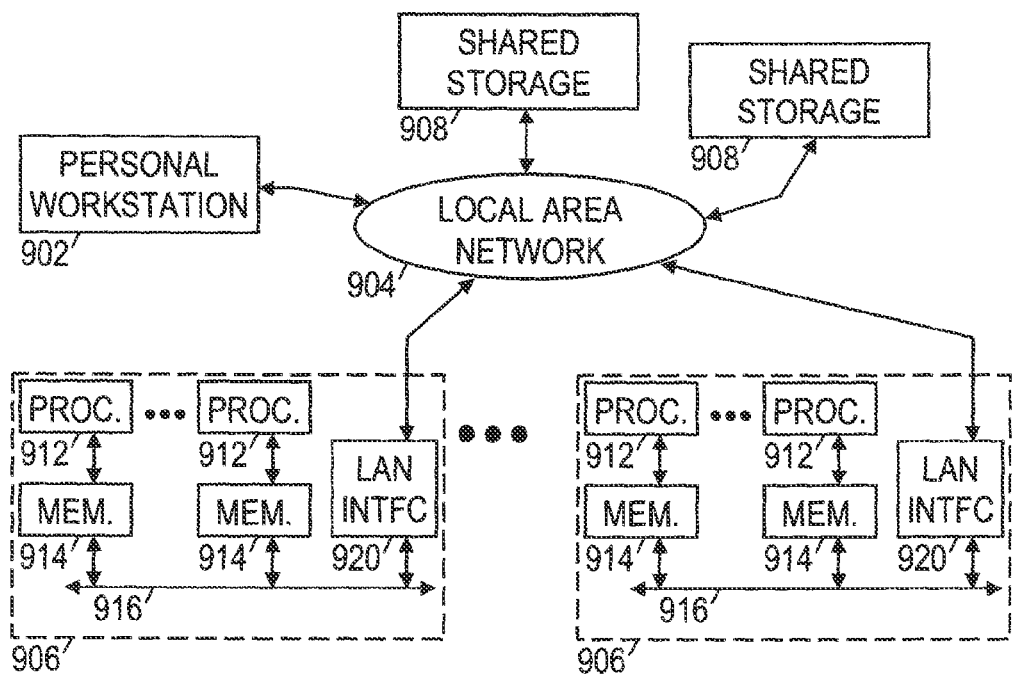
FIG. 9 shows an illustrative imaging system.

FIG. 9 shows an illustrative computer system 900 for performing seismic data processing including seismic imaging with a fast target-oriented calculation of illumination. A personal workstation 902 is coupled via a local area network (LAN) 904 to one or more multi-processor computers 906, which are in turn coupled via the LAN to one or more shared storage units 908. Personal workstation 902 serves as a user interface to the processing system, enabling a user to load survey data into the system, to retrieve and view image data from the system, and to configure and monitor the operation of the processing system. Personal workstation 902 may take the form of a desktop computer with a graphical display that graphically shows survey data and 3D images of the survey region, and with a keyboard that enables the user to move files and execute processing software.

LAN 904 provides high-speed communication between multi-processor computers 906 and with personal workstation 902. The LAN 904 may take the form of an Ethernet network.

Multi-processor computer(s) 906 provide parallel processing capability to enable suitably prompt conversion of seismic trace signals into a survey region image. Each computer 906 includes multiple processors 912, distributed memory 914, an internal bus 916, and a LAN interface 920. Each processor 912 operates on an allocated portion of the input data to produce a partial image of the seismic survey region. Associated with each processor 912 is a distributed memory module 914 that stores conversion software and a working data set for the processor's use. Internal bus 916 provides inter-processor communication and communication to the LAN networks via interface 920. Communication between processors in different computers 906 can be provided by LAN 904.

Shared storage units 908 may be large, stand-alone information storage units that employ magnetic disk media for nonvolatile data storage. To improve data access speed and reliability, the shared storage units 908 may be configured as a redundant disk array. Shared storage units 908 initially store a velocity data volume and shot gathers from a seismic survey. The illumination matrix values and/or reflectivity image volumes can be stored on shared storage units 908 for later processing. In response to a request from the workstation 902, the image volume data can be retrieved by computers 906 and supplied to workstation for conversion to a graphical image to be displayed to a user.

Numerous variations and modifications will become apparent to those skilled in the art once the above disclosure is fully appreciated. It is intended that the following claims be interpreted to embrace all such variations and modifications.

What is claimed is:

1. A seismic imaging method that comprises:
   obtaining multiple shot gathers for a survey region;
   grouping shot gathers having overlapping receiver positions to form at least one multi-shot gather;
   concurrently determining, for each shot position and each receiver position in a given multi-shot gather, a Green's function at potential scattering points in the survey region;
   combining said Green's functions to find an illumination value at each of said potential scattering points;
   finding a reflectivity value at each of said potential scattering points based at least in part on the illumination values; and
   displaying an image of the survey region to a user, wherein the image is based at least in part on said reflectivity values.

2. The method of claim 1, further comprising:
   repeating said determining, combining, and finding operations for other multi-shot gathers; and
   accumulating reflectivity values determined from multiple multi-shot gathers to form said image of the survey region.

3. The method of claim 2, wherein each multi-shot gather represents one sail line in a marine seismic survey.

4. The method of claim 1, wherein said Green's functions are determined one-way wave equation propagation with beamlet decomposition and direct local plane wave decomposition in the frequency domain.

5. The method of claim 4, wherein said concurrent determination of each of the Green's functions is performed for one depth slice of the survey region at a time, and the determination for each depth slice is interleaved with said combining.

6. The method of claim 4, wherein said concurrent determination of each of the Green's functions is performed over a full target region before said combining is performed.

7. The method of claim 1, wherein said reflectivity value at a given scattering point $\bar{x}$ is expressible as sum of reflectivity components at a frequency $\omega$, shot index s, incident angle $\theta_s$, and scattering angle $\theta_g$, wherein each of said reflectivity components is expressible as a ratio between a convolution image value $I(\bar{x},\omega,s,\theta_s,\theta_g)$ and an illumination value $D(\bar{x},\omega,\theta_s,\theta_g)$, said convolution image value $I(\bar{x},\omega,s,\theta_s,\theta_g)$ being expressible as a frequency domain product between a forward-propagated source wavefield and a back-propagated receive wavefield.

8. The method of claim 7, wherein the illumination value $D(\bar{x},\omega,\theta_s,\theta_g)$ is expressible as a sum of products between a source contribution and a receiver contribution $A(\bar{x},\omega,s,\theta_g)$:

$$D(\bar{x}, \omega, \theta_s, \theta_g) = \sum_{s=1}^{n_{stk}} |G(\bar{x}, \omega, s, \theta_s)|^2 A(\bar{x}, \omega, s, \theta_g),$$

where the shot index number s ranges from 1 to fold number $n_{stk}=n_{stk}(\bar{x},\omega,\bar{\theta}_s,\bar{\theta}_g)$, $G(\bar{x},\omega,s,\bar{\theta}_s)$ is the Green's function from the position of shot s to scattering point $\bar{x}$, and the receiver contribution is expressible as:

$$A(\bar{x}, \omega, s, \theta_g) = \sum_{r}^{n_{recv}} |G(r, \bar{x}, \omega, s, \theta_g)|^2,$$

with $G(r,\bar{x},\omega,s,\theta_g)$ being the Green's function from receiver r to scattering point $\bar{x}$ (at frequency $\omega$ with scattering angle $\bar{\theta}_{g\ g}$) for shot s.

9. The method of claim 8, wherein said combining includes exploiting overlapping receiver positions of different shots by determining the receiver contribution $A(\bar{x},\omega,s,\theta_g)$ on a rolling sum basis.

10. The method of claim 1, wherein said combining is performed only for potential scattering points in a target region that is a subset of the survey region.

11. A seismic imaging system that comprises:
    at least one storage device that stores shot gathers from a seismic survey of a given survey region;
    a memory that stores seismic imaging software; and
    at least one processor coupled to the memory to execute the seismic imaging software, wherein the software configures the at least one processor to:
    retrieve multiple shot gathers from the storage device;
    group shot gathers having overlapping receiver positions to form at least one multi-shot gather;
    concurrently determine, for each shot position and each receiver position in each multi-shot gather, a Green's function at potential scattering points in the survey region;
    combine said Green's functions to find an illumination value at each of said potential scattering points;
    find a reflectivity value at each of said potential scattering points based at least in part on the illumination values; and
    generate an image of the survey region for display to a user, wherein the image is based at least in part on said reflectivity values.

12. The system of claim 11, wherein the software further configures the at least one processor to accumulate reflectivity values determined from multiple multi-shot gathers to form said image of the survey region.

13. The system of claim 12, wherein each multi-shot gather represents one sail line in a marine seismic survey.

14. The system of claim 11, wherein said Green's functions are determined one-way wave equation propagation with beamlet decomposition and direct local plane wave decomposition in the frequency domain.

15. The system of claim 14, wherein said concurrent determination of each of the Green's functions is performed for one depth slice of the survey region at a time, and the determination for each depth slice is interleaved with said combining.

16. The system of claim 14, wherein said concurrent determination of each of the Green's functions is performed over a full target region before said combining is performed.

17. The system of claim 11, wherein said reflectivity value at a given scattering point $\bar{x}$ is expressible as sum of reflectivity components at a frequency $\omega$, shot index s, incident angle $\theta_s$, and scattering angle $\theta_g$, wherein each of said reflectivity components is expressible as a ratio between a convolution image value $I(\bar{x},\omega,s,\theta_s,\theta_g)$ and an illumination value $D(\bar{x},\omega,\theta_s,\theta_g)$, said convolution image value $I(\bar{x},\omega,s,\theta_s,\theta_g)$ being expressible as a frequency domain product between a forward-propagated source wavefield and a back-propagated receive wavefield.

18. The system of claim 17, wherein the illumination value $D(\bar{x},\omega,\theta_s,\theta_g)$ is expressible as a sum of products between a source contribution and a receiver contribution $A(\bar{x},\omega,s,\theta_g)$:

$$D(\bar{x}, \omega, \theta_s, \theta_g) = \sum_{s=1}^{n_{stk}} |G(\bar{x}, \omega, s, \theta_s)|^2 A(\bar{x}, \omega, s, \theta_g),$$

where the shot index number s ranges from 1 to fold number $n_{stk}=n_{stk}(\bar{x},\omega,\bar{\theta}_s,\bar{\theta}_g)$, $G(\bar{x},\omega,s,\bar{\theta}_s)$ is the Green's function from the position of shot s to scattering point $\bar{x}$, and the receiver contribution is expressible as:

$$A(\bar{x}, \omega, s, \theta_g) = \sum_{r}^{n_{recv}} |G(r, \bar{x}, \omega, s, \theta_g)|^2,$$

with $G(r,\bar{x},\omega,s,\theta_g)$ being the Green's function from receiver r to scattering point $\bar{x}$ (at frequency $\omega$ with scattering angle $\bar{\theta}_g$) for shot s.

19. The system of claim 18, wherein as part of combining said Green's functions to find an illumination value, the software configures the at least one processor to exploit overlapping receiver positions of different shots by determining the receiver contribution $A(\bar{x},\omega,s,\theta_g)$ on a rolling sum basis.

20. The system of claim 11, wherein the software configures the at least one processor to combine said Green's functions to find an illumination value only for potential scattering points in a target region that is a subset of the survey region.

* * * * *